(12) United States Patent
O'Sullivan et al.

(10) Patent No.: US 8,748,741 B2
(45) Date of Patent: Jun. 10, 2014

(54) CORROSION RESISTANT MULTIPLE TAP CONNECTORS

(75) Inventors: Edward O'Sullivan, Cary, NC (US); George W. Pullium, III, Garner, NC (US)

(73) Assignee: Tyco Electronics Corporation, Berwyn, PA (US)

( * ) Notice: Subject to any disclaimer, the term of this patent is extended or adjusted under 35 U.S.C. 154(b) by 159 days.

(21) Appl. No.: 13/219,821

(22) Filed: Aug. 29, 2011

(65) Prior Publication Data

US 2012/0097414 A1    Apr. 26, 2012

Related U.S. Application Data

(60) Provisional application No. 61/406,372, filed on Oct. 25, 2010.

(51) Int. Cl.
*H02G 3/14* (2006.01)

(52) U.S. Cl.
USPC .......................................................... 174/50

(58) Field of Classification Search
None
See application file for complete search history.

(56) References Cited

U.S. PATENT DOCUMENTS

| | | |
|---|---|---|
| 3,020,260 A | 2/1962 | Nelson |
| 4,369,284 A | 1/1983 | Chen |
| 4,424,406 A | 1/1984 | Slater et al. |
| 4,634,207 A | 1/1987 | Debbaut |
| 4,680,233 A | 7/1987 | Camin et al. |
| 4,716,183 A | 12/1987 | Gamarra et al. |
| 4,777,063 A | 10/1988 | Dubrow et al. |
| 4,909,756 A * | 3/1990 | Jervis ............................ 439/521 |
| 4,942,270 A | 7/1990 | Gamarra |
| 5,079,300 A | 1/1992 | Dubrow et al. |
| 5,140,746 A | 8/1992 | Debbaut |

(Continued)

FOREIGN PATENT DOCUMENTS

| | | |
|---|---|---|
| EP | 1 467 438 A2 | 10/2004 |
| WO | WO 96/23007 | 8/1996 |
| WO | WO 2008/115362 A2 | 9/2008 |
| WO | WO 2009/011812 A2 | 1/2009 |

OTHER PUBLICATIONS

Notification Concerning Transmittal of International Preliminary Report on Patentability in corresponding PCT Application No. PCT/US2011/054852 mailed May 10, 2013 (9 pages).

*Primary Examiner* — Hoa C Nguyen
*Assistant Examiner* — Xanthia C Cunningham
(74) *Attorney, Agent, or Firm* — Myers Bigel Sibley & Sajovec, PA (57) ABSTRACT

A multi-tap enclosure for an electrical cable includes a housing including a first wall and an opposite second wall and a third wall extending between the first and second wall. A first opening is in the first wall of the housing. The first opening defines a main cable axis for the multi-tap enclosure. A second opening is in the second wall of the housing. The second opening is located on the main cable axis. A main cable access opening is in the third wall of the housing. The main cable access opening has a frangible wall therein configured to allow movement of the electrical cable horizontally therethrough towards the main cable axis. The first opening and the second opening have frangible covers therein configured to allow movement of the electrical cable horizontally therethrough towards the main cable axis to allow the electrical cable to extend along the main cable axis through the first and second openings when installed in the multi-tap enclosure.

18 Claims, 6 Drawing Sheets

(56) References Cited

U.S. PATENT DOCUMENTS

| | | | | |
|---|---|---|---|---|
| 5,177,143 A | | 1/1993 | Chang et al. | |
| 5,756,935 A | * | 5/1998 | Balanovsky et al. | 174/549 |
| 5,763,835 A | | 6/1998 | Huynh-Ba et al. | |
| 5,814,905 A | * | 9/1998 | Tang | 307/147 |
| 5,850,165 A | * | 12/1998 | Spriester et al. | 333/100 |
| 5,909,154 A | * | 6/1999 | Brown et al. | 333/100 |
| 5,934,930 A | * | 8/1999 | Camps et al. | 439/425 |
| 5,994,976 A | * | 11/1999 | Tang | 333/100 |
| 6,018,278 A | * | 1/2000 | Tang | 333/100 |
| 6,022,240 A | * | 2/2000 | McCleerey et al. | 439/410 |
| 6,036,535 A | * | 3/2000 | Whiteman et al. | 439/519 |
| 6,039,596 A | * | 3/2000 | Whiteman et al. | 439/404 |
| 6,074,238 A | * | 6/2000 | DeRoss et al. | 439/409 |
| 6,074,250 A | * | 6/2000 | Tang | 439/579 |
| 6,083,035 A | * | 7/2000 | Mackey et al. | 439/410 |
| 6,133,939 A | * | 10/2000 | Gresko et al. | 725/127 |
| 6,142,815 A | * | 11/2000 | Whiteman et al. | 439/381 |
| 6,265,665 B1 | * | 7/2001 | Zahnen | 174/92 |
| D462,329 S | * | 9/2002 | Hughes et al. | D13/152 |
| 6,580,336 B1 | * | 6/2003 | Gerszberg et al. | 333/100 |
| 6,593,830 B2 | * | 7/2003 | Wu | 333/100 |
| 6,648,672 B1 | * | 11/2003 | Meinke | 439/422 |
| 7,086,078 B1 | * | 8/2006 | Gresko et al. | 725/127 |
| 7,201,600 B2 | * | 4/2007 | Sokol et al. | 439/367 |
| D545,765 S | * | 7/2007 | Cockburn | D13/147 |
| 7,488,195 B2 | * | 2/2009 | Sokol et al. | 439/369 |
| 7,635,110 B2 | * | 12/2009 | Galasso et al. | 248/200 |
| 7,686,661 B2 | * | 3/2010 | Shrum et al. | 439/781 |
| 8,063,306 B2 | * | 11/2011 | Zhong et al. | 174/92 |
| 8,227,696 B2 | * | 7/2012 | Pullium et al. | 174/92 |
| 2002/0092664 A1 | * | 7/2002 | Young et al. | 174/66 |
| 2005/0133235 A1 | * | 6/2005 | Cole | 174/48 |
| 2006/0102336 A1 | | 5/2006 | Campbell | 166/65.1 |
| 2006/0254794 A1 | * | 11/2006 | Burke et al. | 174/38 |

* cited by examiner

CORROSION RESISTANT MULTIPLE TAP CONNECTORS

RELATED APPLICATION(S)

The present application claims the benefit of U.S. Provisional Patent Application No. 61/406,372, filed Oct. 25, 2010, the disclosure of which is hereby incorporated herein by reference in its entirety.

BACKGROUND OF THE INVENTION

The present invention relates to environmentally protective enclosures and, more particularly, to enclosures for environmentally protecting cable connections and the like.

Partially sealant-filled environmentally protective enclosures are employed to protect cable connections. Such enclosures may be used to environmentally protect the connections between telecommunications signal transmission cables, the electrical power transmission cables, etc. For example, U.S. Pat. No. 5,763,835 to Huynh-Ba, et al. discloses a gel-filled enclosure including a pair of cavitied bodies that are hingedly connected and closable in clam shell fashion. When the enclosure is closed about the cables, gel is typically displaced and thereby elongated and seals about a cable splice or the like. However, such enclosures are typically adapted to suitably seal about a limited range of connection/cable sizes. Additionally, for relatively large connections and cables, the force required to close an enclosure about the connection/cables may be unduly large.

It is also known to provide overhead multi-tap (multiple tap) closures for use with electrical power transmission cables and the like. Most overhead multiple tap connectors only provide an empty plastic housing, separate from the connector (conductive component), which only provides touch protection for the energized connector with very limited corrosion protection of the connector or its tap screws. The connectors may corrode due to being exposed to the outside elements and the utility linesman may not be able to remove a tap cable from the connector due to corrosion of the tap screws to a point where they are no longer removable. This generally requires the tap cable to be cut or the connector must be cut off the line entirely.

Tyco Electronics (TE Connectivity) offers a product line, called Gelport™, which provides entry for multiple cables into a connector and a separate cap to allow access to the screws. In addition, Tyco Electronics (TE Connectivity) offers a product line, called GHFC, which seals a connector in a gel-filled plastic box after it is installed on the line.

SUMMARY OF THE INVENTION

According to some embodiments of the present invention, a multi-tap enclosure for an electrical cable includes a housing including a first wall and an opposite second wall and a third wall extending between the first and second wall. A first opening is in the first wall of the housing. The first opening defines a main cable axis for the multi-tap enclosure. A second opening is in the second wall of the housing. The second opening is located on the main cable axis. A main cable access opening is in the third wall of the housing. The main cable access opening has a frangible wall therein configured to allow movement of the electrical cable horizontally therethrough towards the main cable axis. The first opening and the second opening have frangible covers therein configured to allow movement of the electrical cable horizontally therethrough towards the main cable axis to allow the electrical cable to extend along the main cable axis through the first and second openings when installed in the multi-tap enclosure.

In further embodiments, a multi-tap enclosure for an electrical cable includes a housing having a first main cable opening and a second main cable opening and a tap cable opening. An electrically conductive multi-tap connector in the housing has a main cable contact region positioned on a main cable axis extending between the first main cable opening and the second main cable opening and a tap cable contact region proximate the tap cable opening. Securing members are associated with each of the contact regions. The securing members are movable between an open position in which a cable can be inserted in the respective contact regions and a closed position securing a cable inserted in the respective contact regions. A sealant is disposed in the housing and contacts the multi-tap connector to provide environmental protection to the multi-tap connector and connections thereto. A main cable access opening is in the housing. The main cable access opening is configured to allow movement of the electrical cable therethrough into the main cable contact region on the main cable axis to allow the electrical cable to extend along the main cable axis through the first and second openings and be electrically connected to the multi-tap connector in the main cable contact region when installed in the multi-tap enclosure.

In other embodiments, a method of inserting an uncut electrical cable in a multi-tap enclosure includes removing an outer insulating cover of the electrical cable from a section of the electrical cable. The section of the electrical cable is passed horizontally through a frangible wall of a main cable access opening into a main cable contact region of a multiple tap connector in a chamber of a multi-tap enclosure housing having a sealant disposed therein. The electrical cable then extends along a main cable axis from a first opening of the housing to an opposite second opening of the housing. The section of the electrical cable is passed vertically through frangible covers in the first opening and the second opening to seat the section of the electrical cable in the main cable contact region after passing the section of the electrical cable horizontally through the frangible wall of the main cable access opening. Passing the section of the electrical cable horizontally includes passing the section of the electrical cable horizontally through the frangible covers in the first and second openings. The section of the electrical cable is secured in the main cable contact region. The main cable access opening is plugged with a plug of the multi-tap enclosure housing.

BRIEF DESCRIPTION OF THE DRAWINGS

The accompanying drawings, which are incorporated in and constitute a part of the specification, illustrate some embodiments of the invention and, together with the description, serve to explain principles of the invention.

DETAILED DESCRIPTION OF EMBODIMENTS OF THE INVENTION

The present invention now will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention. Like numbers refer to like elements throughout the description.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90° or at other orientations) and the spatially relative descriptors used herein interpreted accordingly.

As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

With reference to FIGS. 1-6, a partially sealant-filled multiple tap enclosure 101 suitable for use on overhead power cables according to some embodiments of the present invention is shown therein. The enclosure 101 is adapted to form a sealed enclosure about and including a multiple tap connector 102 (FIG. 5) and the connection of cables 138, 140 (FIG. 2) or the like thereto. In some embodiments, the enclosure housing defines a chamber that is completely filled with a sealant to provide corrosion protection.

The enclosure 101 includes a housing 100 having a first member 105 and a second member 110 that define a chamber therein. The members 105, 110 each have a cover 112, 114 hingedly connected thereto, which may be a separate part. In the illustrated embodiments, the enclosure 101 is configured to electrically couple up to four tap cables 140 to a main cable 138. In addition to the housing 100, the enclosure 101 includes a plug including plug members 116, 118 coupled to each of the housings members 105, 110 by respective flexible tethers 120, 122, which may be separate parts. The enclosure 101 further includes a multiple tap connector 102 (FIGS. 2, 5) in the chamber defined by the housing 100 with securing members, shown as a main screw 136 and four connector tap screws 134 (two of which are visible in FIGS. 2 and 5), therein. The members 105, 110 may be snapped together to form a unified housing with the connector 102 therein using the four mating connector plastic housing tabs 149 (including tongues 149a and mating grooves 149b on respective ones of the members 105, 110) in the illustrated embodiments. In the illustrated embodiments, the members 105, 110 are configured to maintain the connector 102 in a fixed position, in the illustrated embodiments, by using internal ribs 192 each include that maintain the connector 102 in position in the housing 100. The second member 110 is illustrated as including four tap cable openings 144 for receiving respective tap cables 140 and a main cable opening 146 for receiving the main cable 138. A frangible cover 144a, 146a is positioned in each opening 144, 146. The first member 105 likewise includes a main cable opening 146 with a frangible cover 146a to allow the main cable 138 to extend longitudinally through the enclosure 101. In some embodiments, however, no tap cable openings 144 are provided in the first member 105 as the tap cables 140 need not extend through the enclosure 101. Other embodiments may have more or less than the 4 tap cable openings shown in the illustrated embodiment.

Figure 1:
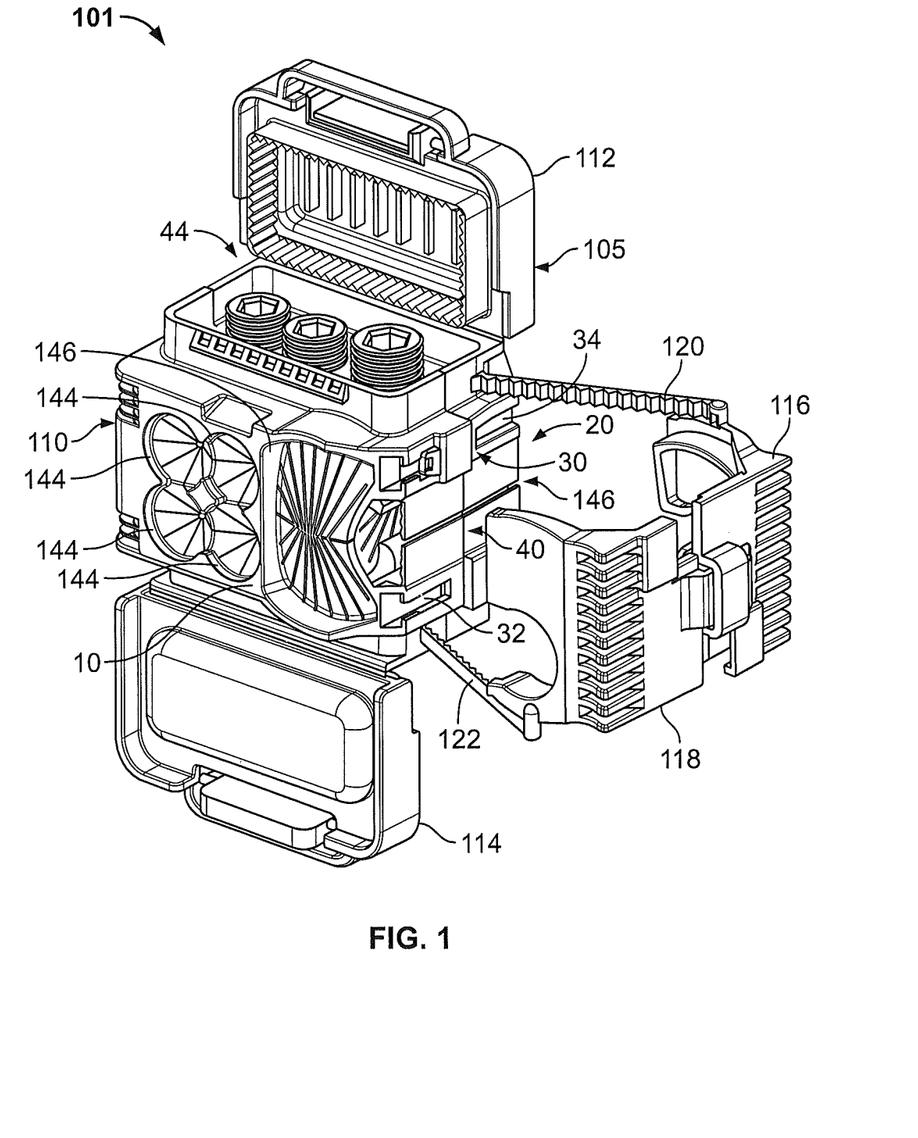
FIG. 1 is a front perspective view of a partially sealant-filled multiple tap enclosure according to some embodiments of the present invention.
Figure 5:
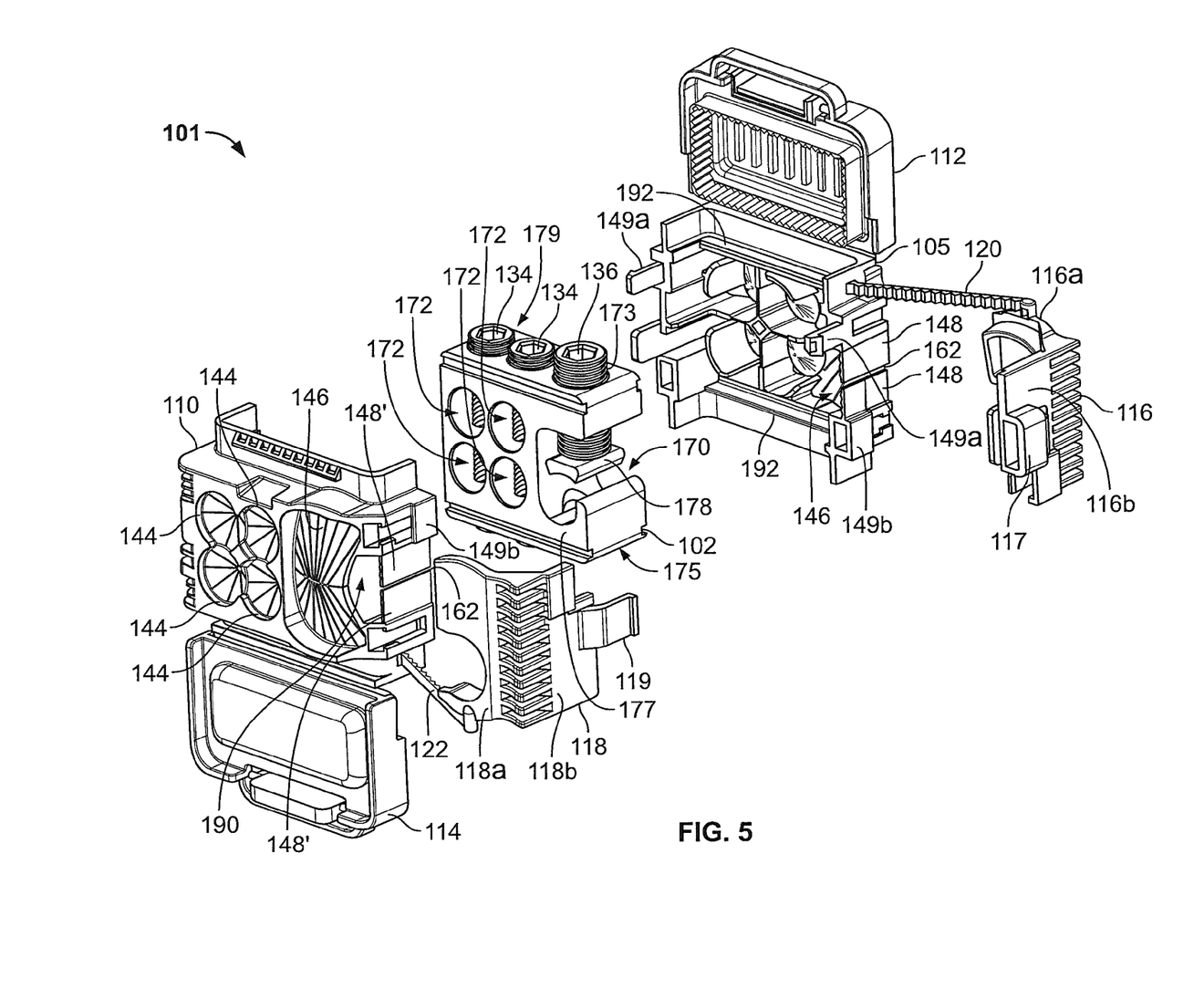
FIG. 5 is an exploded front perspective view of the partially sealant-filled enclosure of FIG. 1.

The connector 102 has a main cable contact region 170 and four tap cable contact regions 172 (FIG. 5). With reference to FIG. 1, the member 110 includes a first wall 10 within which a first main cable opening (i.e., the opening 146 of the member 110) is defined. The member 105 includes a second wall 20 (opposite the wall 10) within which a second main cable opening (i.e., the opening 146 of the member 105) is defined. A side wall 32 of the member 110 and a side wall 34 of the member 105 collectively form a third wall 30 extending axially between the first wall 10 and the second wall 20. A main cable access opening 40 is defined in the third wall 30 and a securing member access opening 44 is defined in the top of the enclosure 101 by the members 105, 110, collectively.

Figure 2:
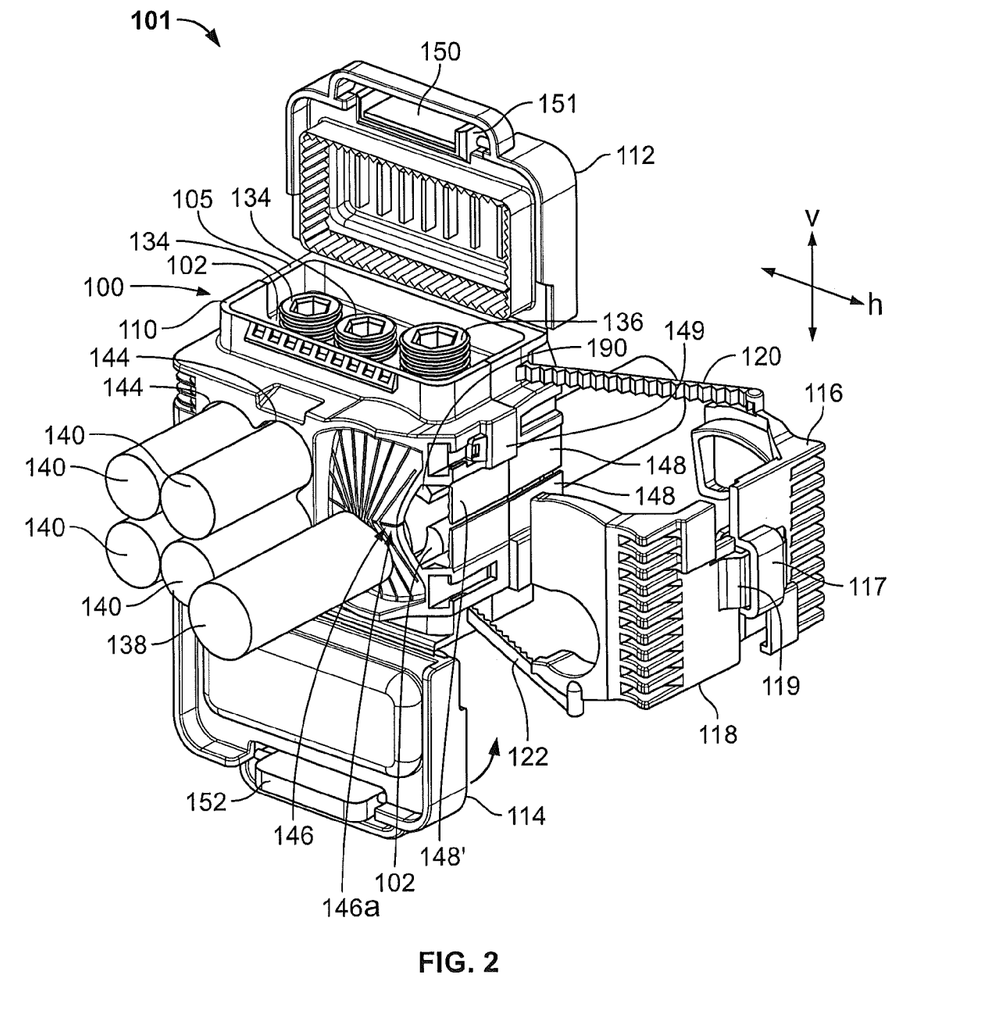
FIG. 2 is a front perspective view of the partially sealant-filled multiple tap enclosure of FIG. 1 with cables installed therein.
Figure 3:
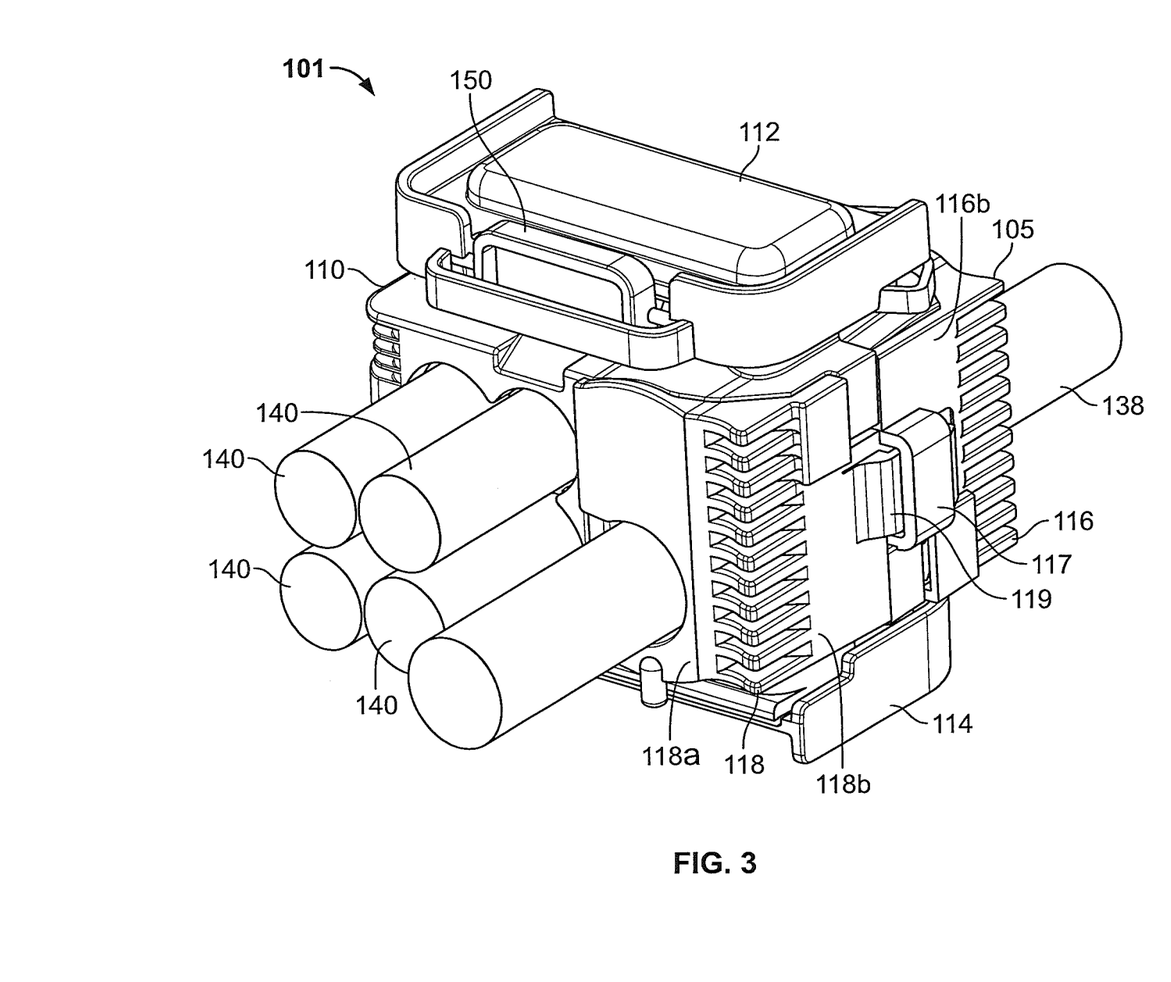
FIG. 3 is a front perspective view of the partially sealant-filled enclosure of FIG. 1 in the fully installed (closed) state.

As best seen in FIG. 2 (open position of covers 112, 114) and FIG. 3 (closed position of covers), the cover 112 allows access to the tap screws 134 and main screw 136 in the open position and covers the tap screws 134, main screw 136 and connector 102 in the closed position. Similarly, the cover 114 provides access to and coverage for the two additional tap screws 134 that are not visible in the figures. When the covers 112, 114 are closed, they may be releasably latched in the closed position by tabs 151 on the latch members 150, 152 of the covers 112, 114.

Figure 4:
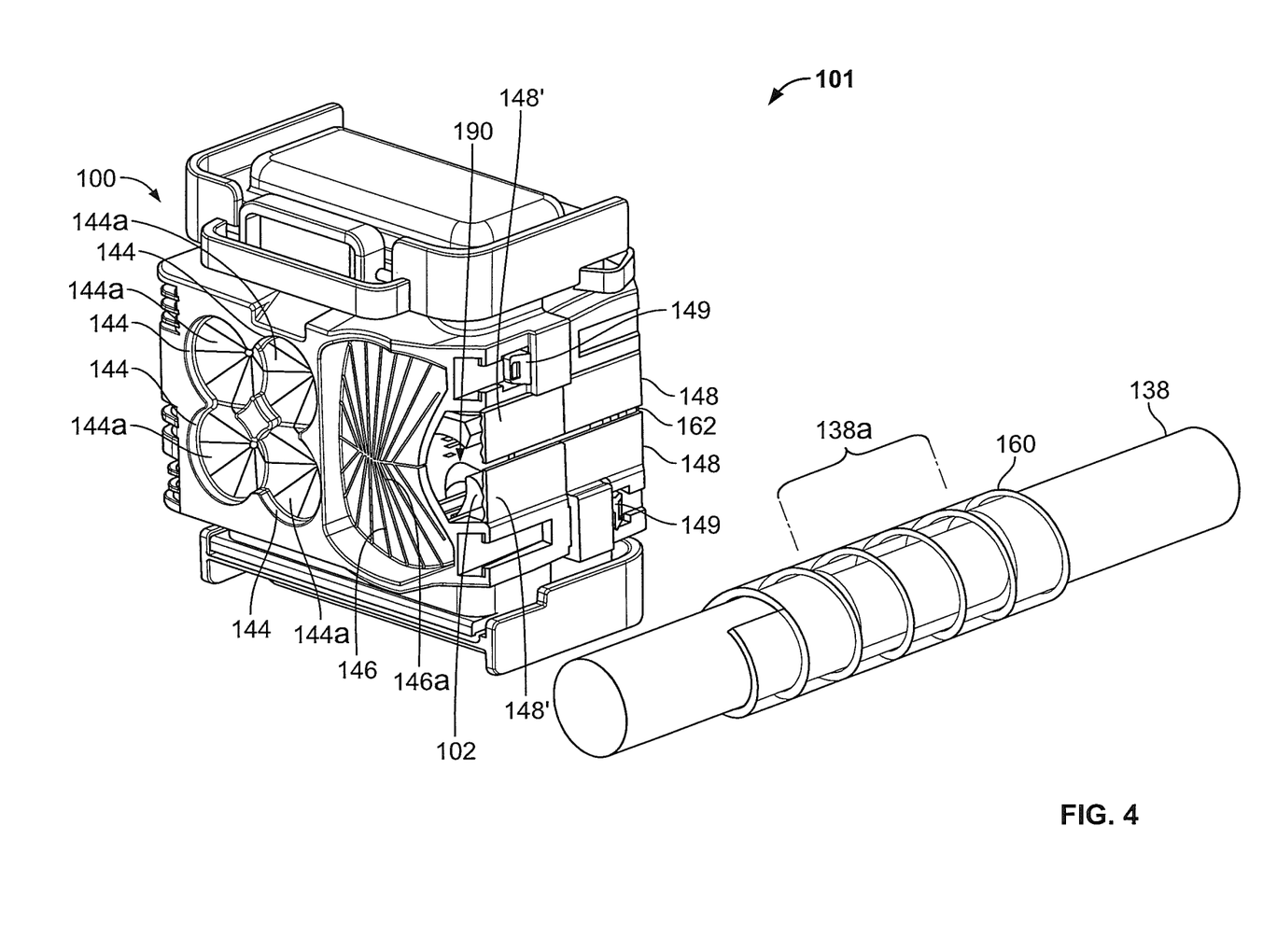
FIG. 4 is a front perspective view of the partially sealant-filled multiple tap enclosure of FIG. 1 with a main cable prepared to be installed therein.

While the tap cables 140 will generally be provided as an end of a cable with a specified tap length of the covering thereof removed that may be inserted longitudinally into the enclosure 101, the main cable 138 may be a longitudinally extending cable that does not have an end thereof available for insertion into the enclosure 101. As such, a method of inserting the main cable 138 into the enclosure 101 and the features of the enclosure 101 related thereto will now be described with reference to FIGS. 3 and 4. FIG. 3 illustrates the main cable 138 inserted in the enclosure 101 with the plug members 116, 118 installed. FIG. 4 illustrates the enclosure 101 with the main cable 138 prepared to be inserted therein. As will be more fully described later herein, before insertion, the main cable 138 has the outer insulating cover thereof removed from a section 138a where an electrical connection will be formed in the enclosure 101. A sealant material, such as a gel wrap strip 160, may be positioned over the section 138a as in the illustrated embodiments of FIG. 4. In the following description, references to a horizontal and vertical direction will be used herein, which directions are relative to the housing as seen by the axes in FIG. 2 for the vertical direction v and the horizontal direction h, both of which are with reference to a cross-sectional plane of the longitudinal axis defined by the main cable 138. It will be understood that, for the relative positioning of the openings shown in the figures, the defined main cable axis would be straight, however, in some embodiments the openings may not be positioned in such a relationship and the main cable axis may be curved.

Figure 6:
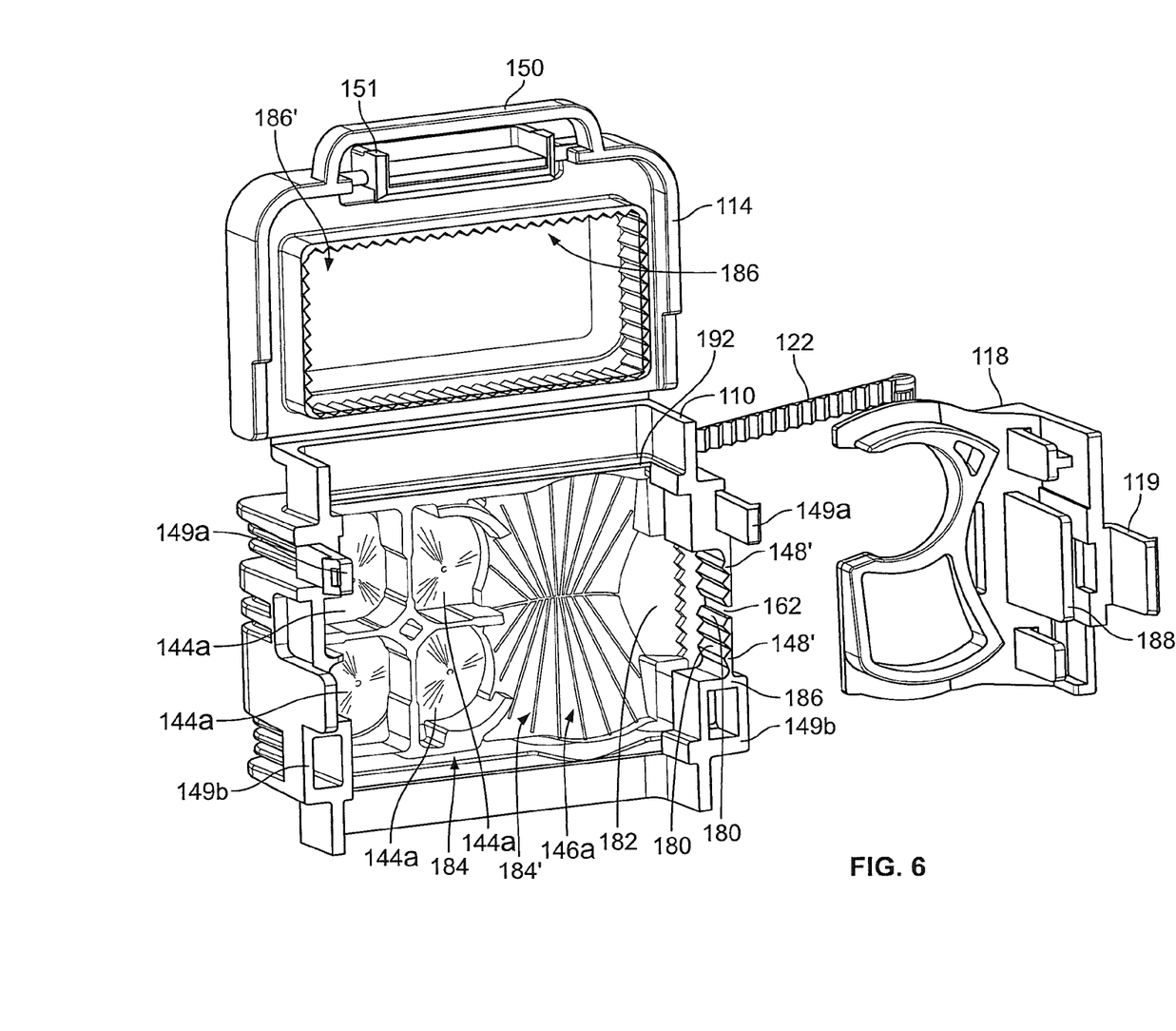
FIG. 6 is perspective view of one half of the housing of the partially sealant-filled multiple tap enclosure of FIG. 1.

During insertion, the main cable 138 is moved horizontally towards the enclosure 101 until it contacts the frangible walls 148, 148'. In particular, the main cable 138 may be vertically aligned to make contact along a gap 162 extending longitudinally along a middle region of the frangible walls 148, 148'. As best seen in FIG. 6, the frangible walls 148, 148' are configured to preferentially bend along a line parallel to the longitudinal axis of the main cable 138 when the cable 138 is pressed horizontally into the enclosure 101 due to the orientation of the ribs 180 (FIG. 6). Other embodiments may have only thin walls at 148 & 148' hingedly connected without ribs. In addition, the frangible covers 146a in the main cable openings 146 of the respective members 105, 110 are configured to be horizontally frangible when contacted by the main cable 138 to allow the main cable 138 to move horizontally there through to be received in a main line contact interface 170 of the connector 102 (FIG. 5).

After the cable 138 is fully inserted horizontally in the enclosure 101, the frangible walls 148, 148' will rotate at least partially back to their original orientation, in part due to loading from a sealant material in the enclosure 101 as will be further described later herein. The main cable 138 is then moved down vertically to be seated in the main line contact interface 170, shown as a J-shaped interface in the illustrated embodiments. The frangible covers 146a in the main cable openings 146 of the respective members 105, 110 are also configured to be vertically frangible when contacted by the main cable 138 to allow the main cable 140 to move vertically there through. In addition, in the illustrated embodiments, an opening 190 (FIG. 5) is provided in each of the members 105, 110 to allow independent flexing of the frangible walls 148, 148' and the frangible cover(s) 146a. Thus, the enclosure 101 in the illustrated embodiments is configured to allow movement along two distinct axes to allow insertion of a longitudinally unbroken section of the main cable 138 therein. As such, the connector 102 may be connected to an overhead main cable 138 after it has already been enclosed in the housing 100, in contrast with the prior art approach of attaching the connector to the main line before snapping an electrically insulated housing around the connector.

After the main cable 138 is inserted and secured in the connector 102 using the main screw 136, the plug members 116, 118 are attached to the housing 100 as seen in FIG. 3. The plug members 116, 118 include a first wall 116a, 118a and a second wall 116b, 118b. The plug members 116, 118 are coupled together when installed by a mating tab 119 and channel 117 on the respective plug members 116, 118. In the attached position, the first wall 116a, 118a of the respective members 105, 110 substantially cover the openings 146 in each member 105, 110 while the second wall 116b, 118b cover the frangible walls 148, 148' to provide improved closure of the connector 102 within the housing 100. In addition, in some embodiments as illustrated in FIG. 6, at least one of the plug members 116, 118 includes a tongue 188. The tongue (s) 188 in some embodiments are tapered to provide a wider opening displaced from the wall 118b than proximate the wall 118b. In some embodiments, when the plug members 116, 118 is mounted to the housing 100 it is slid longitudinally onto the housing, during which motion the frangible walls 148, 148' are engaged by the tongue 188 to rotate the frangible walls 148, 148' more fully towards their original orientation.

In the embodiments shown in the Figures, the plug members 116, 118 are tethered to the respective members 105, 110 by the flexible tethers 120, 122. The flexible tethers 120, 122 may remain attached in the closed position of the plug members 116, 118 shown in FIG. 3. As such, the members 105, 110 and plug members 116, 118 may be conveniently provided as coupled parts both as provided initially and for later use if the enclosure 101 needs to be removed from the cable 138 and subsequently re-installed (although they may be separate parts in other embodiments).

As noted above, in some embodiments, the enclosure 101 is a sealant filled enclosure, which may provide improved corrosion control for the connector 102. As best seen with reference to FIG. 6, masses of sealant 184', 186' are disposed in regions 184, 186 defined by the respective members 105, 110, including ribs 192 for the region 184 (member 110 is shown in FIG. 6, but member 105 may be substantially similarly configured for purposes of this discussion, albeit the frangible covers 144a may not be frangible in member 105 as discussed above). According to some embodiments, and as discussed in more detail below, the sealant 184', 186' in the regions 184, 186 may be a gel. By providing a sealant in both regions 184, 186 in both members 105, 110, each of the corresponding faces 173, 175, 177, 179 of the connector 102 may be contacted by the sealant. Faces 177, 179 are contacted by sealant in regions 184 on coupling of the members 105, 110 while faces 173, 175 are contacted by sealant in regions 186 on closing of the covers 112, 114 as the connector 102 protrudes above the interior plastic walls defining the regions 186 when the covers 112, 114 are closed. In addition, sealant may be moved into the contact regions 170, 172 of the connector 102 by insertion of the cables 138, 140, each of which passes through sealant when inserted into the housing 100. Additional sealant contact to the region 170 may be provided by placement of the sealant 160 on the main cable 138 before insertion as discussed with reference to FIG. 4. Thus, corrosion protection may be provided for not only the coupling between the cables 138, 140 and the connector 102 but also for the tap screws 134, 136. As such, enclosure 101 according to some embodiments may provide for improved reliability for re-use, including removal of installed tap cables 140 or the main cable 138.

The plug members 116, 118 may be integrated (molded-in or tethered) components of the plastic members 105, 110, respectively; and may provide additional electrical and/or corrosion protection to any remaining open areas around the main cable 138. The plug members 116, 118 may or may not have a sealant, such as a gel, therein. They may mechanically cover any remaining open areas in the plastic enclosure members 105, 110 that might exist around the main cable 138 after the connector 102 with its sealant filled enclosure 101 is installed on the line as discussed above. They may also work in conjunction with the sealant (gel strip) 160 of FIG. 4 by displacing sealant/gel within the enclosure 101 to further seal around the main cable 138 and the main screw 136. As also noted above, at least one of the plug members 116, 118 may contain the tongue 188, which may displace the frangible walls 148, 148' at the main line opening of the plastic enclosure 101, pushing these walls 148, 148' back to their flat condition, hence closing up an open area after installation. Additionally, when the plug members 116, 118 are installed, they may perform an insulation function by mechanically covering an open area in the enclosure 101 as well as covering any bare conductor of the main line 138. In some embodiments, plug members 116, 118 are not included.

The housing 100 may be formed of any suitable material. According to some embodiments, the housing 100 is formed of an electrically insulative material. In some embodiments, the housing 100 is formed of a molded polymeric material. The housing 100 may be formed of polypropylene, flame retardant polypropylene, polyethylene and/or any suitable thermoplastic or thermoset material. The housing 100 may be formed of a flame retardant material. The plug members 116, 118 may be separate parts as mentioned above and formed of a different material than members 105, 110. The connector 102 may be an aluminum connector, which may be tin plated. The connector and/or its screws may also be formed of a copper alloy material or combination of copper and aluminum thereof.

As best seen in FIG. 6, all of the described features of the enclosure 101 may be molded into the respective members 105, 110, except for the connector 102 and tap screws 134, 136 therein. In the illustrated embodiments, a sealant material, such as a gel, that is placed in the regions 184, 186 in a liquid form and then cured is used. As seen in the most clearly in FIG. 6, molded in features define enclosed regions where the gel is received before curing except for the opening 190 and the slot 162 (FIG. 5). As shown in FIG. 6, a tape 182 may be applied to the member 105, 110 to cover the opening 190 and to cover the slot 162 up to a desired fill height of the gel. The tape 182 may then be removed after curing of the gel. In some embodiments, the tape may be left in place. In some embodiments, a gasket/fixture may be used to cover the opening rather than using a tape.

As described above, in some embodiments of the present invention, an overhead multiple tap (multi-tap) connector may be pre-installed into a silicone gel filled box with hinged screw covers and an auxiliary tethered main plug. Such connector assemblies may provide access to the connector tap or main screws without having to remove the gel filled box. The connector tap screws may be accessed via, for example, molded hinged screw covers that snap over the tap screw areas. These screw covers may also be filled with silicone gel. The tap connector may first be installed into the gel filled box as a completed product, which is then installed by the customer onto the overhead main line and used as with their non-covered multi-tap connectors. In addition, for even further environmental protection, additional gel sealant could be added, for example, through the openings 190, after installation of the enclosure 101 on the main cable 138. In some embodiments, the housing 100 may be supplied to a user/customer in two halves. The user/customer may then install the housing 100 around the connector 102, either before or after installation of the connector 102 on a main cable.

In some embodiments of the present invention, as described above, corrosion protection may be provided for the exposed main cable. The exposed bare conductor area of the main cable may be wrapped with a strip of silicone gel product prior to the installation of the multi-tap connector. The main screw of the multi-tap connector may then displace this gel strip at the connector/main line and main screw/main line interfaces when the screw is torqued onto the main cable. This approach may provide superior corrosion resistance immediately outside the main screw, while still enabling good electrical contact at the interfaces between the connector and the main line.

In some embodiments of the present invention, as described above, a gel filled plastic enclosure may be pre-assembled around a multi-tap connector, allowing the connector to be installed onto the line after it is installed into the gel filled plastic enclosure.

In some embodiments of the present invention, an auxiliary (molded-in or tethered) "plug" is included in the design of the plastic enclosure to provide additional corrosion protection to any remaining open areas around the main cable. This plug may or may not have gel in it. The plug may mechanically cover any remaining open areas in the plastic enclosure that might exist around the main cable after the connector with its gel filled enclosure is installed on the main line. The plug may also work in conjunction with the gel strip on the main cable by displacing gel within the enclosure to further seal around the main cable and the main screw.

In some embodiments of the present invention, as described above, the plug may contain a "tongue" member, which displaces frangible walls at the main line opening of the plastic enclosure, pushing these walls back to their flat condition, hence closing up an open area after installation. Additionally, when this plug is installed, the tongue member may perform an insulation function by mechanically covering an open area in the box as well as covering any bare conductor of the main line.

According to some embodiments of the invention, the sealant used is a gel. As used herein, "gel" refers to the category of materials that are solids extended by a fluid extender. The gel may be a substantially dilute system that exhibits no steady state flow. As discussed in Ferry, "Viscoelastic Properties of Polymers," $3^{rd}$ ed. P. 529 (J. Wiley & Sons, New York 1980), a polymer gel may be a cross-linked solution whether linked by chemical bonds or crystallites or some other kind of junction. The absence of the steady state flow may be considered to be the key definition of the solid-like properties while the substantial dilution may be necessary to give the relatively low modulus of gels. The solid nature may be achieved by a continuous network structure formed in the material generally through crosslinking the polymer chains through some kind of junction or the creation of domains of associated substituents of various branch chains of the polymer. The crosslinking can be either physical or chemical as long as the crosslink sites may be sustained at the use conditions of the gel.

Gels for use in this invention may be silicone (organopolysiloxane) gels, such as the fluid-extended systems taught in U.S. Pat. No. 4,634,207 to Debbaut (hereinafter "Debbaut '207"); U.S. Pat. No. 4,680,233 to Camin et al.; U.S. Pat. No. 4,777,063 to Dubrow et al.; and U.S. Pat No. 5,079,300 to Dubrow et al. (hereinafter "Dubrow '300"), the disclosures of which are hereby incorporated herein by reference. These fluid-extended silicone gels may be created with nonreactive fluid extenders as in the previously recited patents or with an excess of a reactive liquid, e.g., a vinyl-rich silicone fluid, such that it acts like an extender, as exemplified by the Sylgard® 527 product commercially available from Dow-Corning of Midland, Mich. or as disclosed in U.S. Pat. No. 3,020,260 to Nelson. Because curing is generally involved in the preparation of these gels, they are sometimes referred to as thermosetting gels. The gel may be a silicone gel produced from a mixture of divinyl terminated polydimethylsiloxane, tetrakis(dimethylsiloxy)silane, a platinum divinyltetramethyldisiloxane complex, commercially available from United Chemical Technologies, Inc. of Bristol, Pa., polydimethylsiloxane, and 1,3,5,7-tetravinyltetra-methylcyclotetrasiloxane (reaction inhibitor for providing adequate pot life).

Other types of gels may be used, for example, polyurethane gels as taught in the aforementioned Debbaut '261 and U.S. Pat. No. 5,140,476 Debbaut (hereinafter "Debbaut '476") and gels based on styrene-ethylene butylenestyrene (SEBS) or styrene-ethylene propylene-styrene (SEPSS) extended with an extender oil of naphthenic or nonaromatic or low aromatic content hydrocarbon oil, as described in U.S. Pat. No. 4,369,284 to Chen; U.S. Pat. No. 4,716,183 to Gamarra et al.; and U.S. Pat. No. 4,942,270 to Gamarra. The SEBS and SEPS gels comprise glassy styrenic microphases interconnected by a fluid-extended elastomeric phase. The microphase-separated styrenic domains serve as the junction points in the systems. The SEBS and SEPS gels are examples of thermoplastic systems.

Another class of gels which may be used is EPDM rubber based gels, as described in U.S. Pat. No. 5,177,143 to Chang et al.

Yet another class of gels which may be used is based on anhydride-containing polymers, as disclosed in WO 96/23007. These gels reportedly have good thermal resistance.

The gel may include a variety of additives, including stabilizers and antioxidants such as hindered phenols (e.g., Irganox™ 1076, commercially available from Ciba-Geigy Corp. of Tarrytown, N.Y.), phosphites (e.g., Irgafox™ 168, commercially available from Ciba-Geigy Corp. of Tarrytown, N.Y.), metal deactivators (e.g., Irganox™ D1024 from Ciba-Geigy Corp. of Tarrytown, N.Y.), and sulfides (e.g., Cyanox LTDP, commercially available from American Cyanamid Co. of Wayne, N.J.), light stabilizers (i.e., Cyasorb UV-531, commercially available from American Cyanamid Co. of Wayne, N.J.), and flame retardants such as halogenated paraffins (e.g., Bromoklor 50, commercially available from Ferro Corp. of Hammond, Ind.) and/or phosphorous containing organic compounds (e.g., Fyrol PCF and Phosflex 390, both commercially available from Akzo Nobel Chemicals Inc. of Dobbs Ferry, N.Y.) and acid scavengers (e.g., DHT-4A, commercially available from Kyowa Chemical Industry Co. Ltd through Mitsui & Co. of Cleveland, Ohio, and hydrotalcite). Other suitable additives include colorants, biocides, tackifiers and the like described in "Additives for Plastics, Edition 1" published by D.A.T.A., Inc. and The International Plastics Selector, Inc., San Diego, Calif.

In some embodiments, suitable gel materials include POWERGEL sealant gel available from Tyco Electronics (TE Connectivity) Energy Division of Fuquay-Varina, NC under the RAYCHEM brand. In some embodiments, a thicker (less flowing prior to curing) gel is used for the sealant 160, such as a gel wrap strip of Thixo(tropic) gel, also available from Tyco Electronics.

Alternatively, the sealant may be a non-gel sealant. For example, the sealant may be silicone grease or a hydrocarbon-based grease.

The enclosure may be formed in the following manner. The members 105, 110 and the hinged covers 112, 114 may be integrally formed. According to some embodiments, the members 105, 110 and the hinged covers 112, 114 are unitarily molded. According to some embodiments, the plug members 116, 118 and tethers 120, 122 are also unitarily molded with the members 105, 110. The housing 100 may be injection molded.

If the sealant is a material, such as a curable gel, that requires curing, the sealant may be cured in situ. As will be apparent to those skilled in the art from the description herein, partially sealant-filled enclosures of the present invention may be formed by other methods.

The enclosure 101 may provide a number of advantages. The enclosure 101 may provide a reliable (and, in at least some embodiments, moisture-tight) seal about the connector 102. The sealant, particularly gel sealant, may accommodate cables of different sizes within a prescribed range. For example, in some embodiments, the main cable 138 may range from 250 kcmil maximum, down to #2 AWG minimum with a maximum outside insulation diameter of 0.72". The four tap cables 140 may range from 4/0 AWG maximum, down to #6 AWG minimum or 1/0 ACSR).

Various properties of the gel as described above may ensure that the gel sealant maintains a reliable and long lasting seal, between the housing 100 and the cables 138, 140. The elastic memory of and the retained or restoring force in the elongated, elastically deformed gel generally cause the gel to bear against the mating surfaces of the cables 138, 140 and the interior surface of the housing 100. Also, the tack of the gel may provide adhesion between the gel and these surfaces. The gel, even though it is cold-applied, is generally able to flow about the cables 138, 140 and the housing 100 to accommodate their irregular geometries.

The sealant, particularly when formed of a gel as described herein, in addition to providing corrosion protection, may, in some embodiments, provide a reliable moisture barrier for the cables 138, 140 and the connector 102, even when the enclosure 101 is submerged or subjected to extreme temperatures and temperature changes, although in such embodiments the enclosure 101 may be at least more fully sealant-filled. The housing 100 may be made from an abrasion resistant material that resists being punctured by the abrasive forces.

The gel may also serve to reduce or prevent fire. The gel is typically a more efficient thermal conductor than air and, thereby, may conduct more heat from the connection. In this manner, the gel may reduce the tendency for overheating of the connector 102 that might otherwise tend to deteriorate the cable insulation and cause thermal runaway and ensuing electrical arcing at the connection. Moreover, the gel may be flame retardant.

As will be appreciated from the description herein, enclosures according to the present invention may be provided as pre-formed and fully assembled units, with pre-cured gel or other sealant therein as described above, that may be cold applied about a connection assembly to form an environmental seal.

While, in accordance with some embodiments, the housing 100 is integrally and unitarily formed, the housing may be otherwise formed in accordance with some aspects of invention. For example, the members 105, 100 and their respective covers 112, 114 and plug members 116, 118 may be separate parts joined together in hinged fashion or otherwise. According to some embodiments, the covers 112, 114 are not hinged, but are instead provided as two separate members that are secured to the members 105, 110 by latch structures, ties, clamps or other suitable means allowing repeated access to the tap screws 134, 136.

The frangible walls 148, 148' and covers 144a, 146a may be constructed as described in U.S. Pat. No. 5,763,863 to Huynh-Ba, et al., the disclosure of which is incorporated herein by reference. Additionally or alternatively, the covers 144a, 146a may be formed with pre-formed holes for receiving a cable or cables (in which case supplemental means may be provided for retaining uncured sealant in the regions 184 during manufacture.

It will be appreciated that enclosures in accordance with the present invention may have components (e.g., cover members, walls, etc.) and cavities or chambers having shapes, configurations and/or sizes different than those shown and described herein.

Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention. Therefore, it is to be understood that the foregoing is illustrative of the present invention and is not to be construed as limited to the specific embodiments disclosed, and that modifications to the disclosed embodiments, as well as other embodiments, are intended to be included within the scope of the invention.

What is claimed:

1. A multi-tap enclosure for an electrical cable, comprising:
a housing including a first wall and an opposite second wall and a third wall extending between the first and second walls;
a first opening in the first wall of the housing, the first opening defining a main cable axis for the multi-tap enclosure;
a second opening in the second wall of the housing, wherein the second opening is located on the main cable axis; and
a main cable access opening in the third wall of the housing, the main cable access opening having a frangible wall therein configured to allow movement of the electrical cable horizontally therethrough towards the main cable axis, wherein the first opening and the second opening have frangible covers therein configured to allow movement of the electrical cable horizontally therethrough towards the main cable axis to allow the electrical cable to extend along the main cable axis through the first and second openings when installed in the multi-tap enclosure.

2. The multi-tap enclosure of claim 1, wherein the frangible covers of the first and second openings are further configured to allow movement of the electrical cable vertically therethrough.

3. The multi-tap enclosure of claim 2, wherein the housing includes openings therein between the first opening and the third wall and the second opening and the third wall positioned to allow independent flexing of the frangible wall in the main cable access opening and the frangible covers in the first and second openings.

4. The multi-tap enclosure of claim 2, further comprising a plug flexibly coupled to the housing having an open position exposing the main cable access opening and a closed position covering the main cable access opening and at least a portion of the first and second opening.

5. The multi-tap enclosure of claim 2, further comprising a plurality of tap cable openings in at least one of the first wall and the second wall, wherein each of the tap cable openings has a frangible cover therein to allow insertion of a tap cable therethrough.

6. The multi-tap enclosure of claim 5, further comprising an electrically conductive multiple tap connector in the housing, wherein the multiple tap connector comprises:
a main cable contact region extending therethrough, the main cable access opening extending along the main cable axis and having a side opening facing the frangible wall in the third wall that is sized to receive the electrical cable therethrough;
a plurality of tap cable contact regions configured to receive tap cables inserted through respective ones of the plurality of tap cable regions; and
securing members associated with respective ones of the contact regions, the securing members being movable between an open position in which a cable can be inserted in the respective contact regions and a closed position securing a cable inserted in the respective contact regions.

7. The multi-tap enclosure of claim 6, further comprising:
a securing member access opening in the housing configured to allow access to the securing members to move the securing members between the open and closed positions thereof; and
a cover over the securing member access opening, the cover being movable between an open position allowing access to the securing members and a closed position covering the securing member access opening.

8. The multi-tap enclosure of claim 7, further comprising a sealant disposed in the housing and contacting the multi-tap connector.

9. The multi-tap enclosure of claim 8, wherein the housing includes at least enough of the sealant that insertion of the electrical cable through the frangible wall and into the main cable region causes a displacement of the sealant that presses the frangible wall back towards a rest position in a horizontal direction opposite the direction of horizontal movement of the electrical cable during insertion of the electrical cable.

10. The multi-tap enclosure of claim 9, wherein the sealant comprises a gel and wherein the cover over the securing member access opening includes a sealant filled region and wherein the enclosure further comprises a plug flexibly coupled to the housing having an open position exposing the main cable access opening and a closed position covering the main cable access opening and at least a portion of the first and second opening and wherein, when the plug and the cover are in their closed position, they place the gel in the housing and in the cover over the securing member under compression.

11. The multi-tap enclosure of claim 10, wherein the plug further comprises a tongue configured to rotate the frangible wall towards the rest position when the plug is in the closed position and wherein the housing includes internal ribs that contact the multiple tap connector to maintain the multiple tap connector in a fixed position in the housing.

12. The multi-tap enclosure of claim 8, wherein the multi-tap enclosure comprises a re-usable enclosure configured to repeatedly receive the electrical cable therein and remove the electrical cable therefrom.

13. The multi-tap enclosure of claim 8, wherein the housing comprises:
a first member; and
a second member removably coupled to the first member to define the housing and a chamber therein, wherein the chamber is configured to receive the multi-tap connector and wherein the first opening, the second opening, the main cable access opening and the securing member access opening extend into the chamber.

14. The multi-tap enclosure of claim 13, further comprising a plug, wherein the plug comprises:
    a first plug member coupled to the first member; and
    a second plug member coupled to the second member, wherein the second plug member is removably coupled to the first plug member to define the plug and wherein the plug has an open position exposing the main cable access opening and a closed position covering the main cable access opening and at least a portion of the first and second opening.

15. The multi-tap enclosure of claim 14, wherein the first member, the second member, the first plug member and the second plug member comprise molded polymeric material.

16. The multi-tap enclosure of claim 15, wherein the first member and the first plug member are unitarily molded and wherein the second member and the second plug member are unitarily molded.

17. A multi-tap enclosure for an electrical cable, comprising:
    a housing having a first main cable opening, a second main cable opening opposite the first main cable opening, and a tap cable opening, the first and second main cable openings defining a main cable axis;
    an electrically conductive multi-tap connector in the housing having a main cable contact region positioned on the main cable axis extending between the first main cable opening and the second main cable opening, and a tap cable contact region proximate the tap cable opening;
    securing members associated with each of the contact regions, the securing members being movable between an open position in which a cable can be inserted in the respective contact regions and a closed position securing a cable inserted in the respective contact regions;
    a sealant disposed in the housing and contacting the multi-tap connector to provide environmental protection to the multi-tap connector and connections thereto; and
    a main cable access opening in the housing, the main cable access opening being configured to allow movement of the electrical cable therethrough into the main cable contact region on the main cable axis to allow the electrical cable to extend along the main cable axis through and beyond the first and second openings and be electrically connected to the multi-tap connector in the main cable contact region when installed in the multi-tap enclosure.

18. The multi-tap enclosure of claim 17, further comprising:
    a securing member access opening in the housing configured to allow access to the securing members to move the securing members between the open and closed positions thereof; and
    a cover over the securing member access opening, the cover being movable between an open position allowing access to the securing members and a closed position covering the securing member access opening, wherein a portion of the sealant is disposed in the cover to provide environmental protection to the securing member when the cover is in the closed position.

* * * * *